US012445267B2

(12) United States Patent
Schwaderer

(10) Patent No.: US 12,445,267 B2
(45) Date of Patent: Oct. 14, 2025

(54) GENERATING STATISTICALLY COHERENT GARBAGE VALUE DISTRIBUTIONS

(71) Applicant: William D. Schwaderer, Sparks, NV (US)

(72) Inventor: William D. Schwaderer, Sparks, NV (US)

(*) Notice: Subject to any disclaimer, the term of this patent is extended or adjusted under 35 U.S.C. 154(b) by 0 days.

(21) Appl. No.: 18/587,664

(22) Filed: Feb. 26, 2024

(65) Prior Publication Data
US 2025/0080324 A1 Mar. 6, 2025

Related U.S. Application Data

(60) Provisional application No. 63/486,799, filed on Feb. 24, 2023.

(51) Int. Cl.
*H04L 9/06* (2006.01)
(52) U.S. Cl.
CPC ................... *H04L 9/0656* (2013.01)
(58) Field of Classification Search
CPC .................................................. H04L 9/0656
See application file for complete search history.

(56) References Cited

U.S. PATENT DOCUMENTS

| | | | | | |
|---|---|---|---|---|---|
| 9,529,684 | B2* | 12/2016 | Sincan | ................... | G06F 11/263 |
| 11,106,821 | B2* | 8/2021 | Roake | ................... | H04L 9/0618 |
| 11,947,685 | B2* | 4/2024 | Schwaderer | ............ | G06F 7/582 |
| 2019/0294821 | A1* | 9/2019 | Roake | .................... | H04L 9/0631 |
| 2023/0325151 | A1* | 10/2023 | Cai | ......................... | G06F 7/582 |
| | | | | | 708/200 |
| 2023/0359749 | A1* | 11/2023 | Schwaderer | ............ | G06F 7/582 |
| 2024/0296013 | A1* | 9/2024 | Schwaderer | ............ | G06F 7/582 |

* cited by examiner

*Primary Examiner* — Baotran N To
(74) *Attorney, Agent, or Firm* — McCoy Russell LLP

(57) ABSTRACT

A computer-implemented method includes identifying a multiplicity-bit size, constructing a multiplicity of independent Value Ranges, identifying an individual multiplicity-bit value as an initial first multiplicity-bit value, dividing each constructed Value Range into a multiplicity of contiguous Value-Range Bands that do not overlap and collectively encompass all possible values within the Value Range, using PRN values that range between the highest and lowest value within the Value Range associated with the first multiplicity-bit value, to identify a second multiplicity-bit value associated with the Value-Range Band the PRN falls within, concatenating the identified second multiplicity bit value to the first multiplicity-bit value to create a concatenated bit sequence of multiplicity-bit values, designating the second multiplicity-bit value a first bit value, and repeating the second multiplicity-bit identification sequence, concatenating all identified second multiplicity-bit values to the existing concatenated bit sequence of identified second multiplicity-bit values.

10 Claims, 8 Drawing Sheets

Byte Sequences and Blending Preparation

Fig. 1    Byte Sequences and Blending Preparation

Fig. 2 – Illustrated Byte Nibbles and Bit-Pairs

Fig. 3 N-Byte Byte Sequence Bit-Pair Indexing

Example N-Byte Byte Sequence Bit-Pair Census Logic

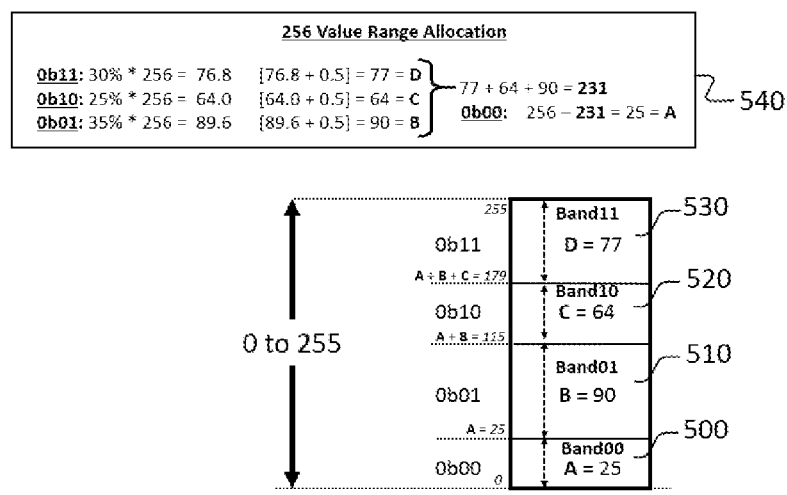
Fig. 5 – Example Bit-Pair *0b00* 256-Value Range Bands

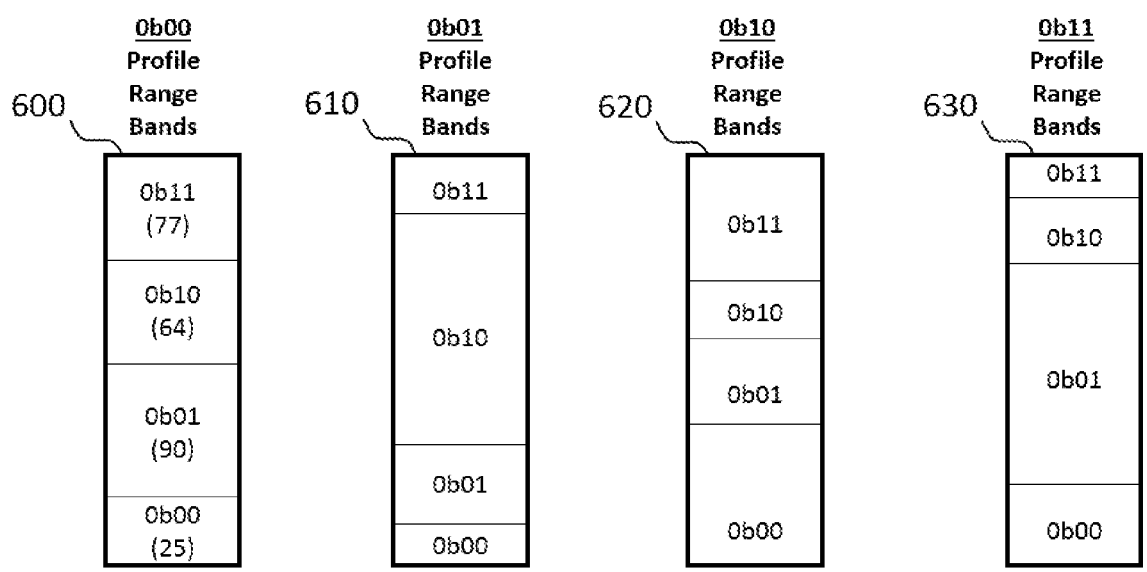
Fig. 6  Example Collective Bit-Pair Profile 256-Value Range Bands For One Target Data Byte Sequence

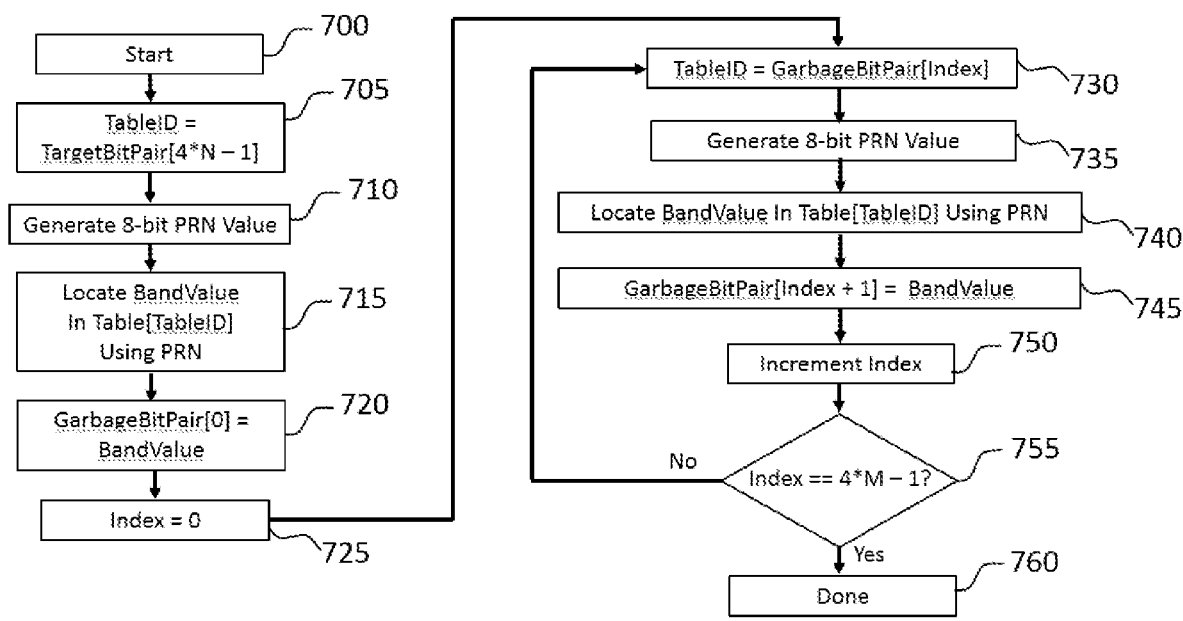
Fig. 7   Example M-Byte Garbage Data Byte Sequence Generation

```
int PRN256, Band, A, B, C, D;

// Perform binary search if (PRN256 < (A + B)) {                // Band00 or Band 01?
    if ( PRN256 < A )                  // Band00?
        Band = 0b00;
    else
        Band = 0b01;
} else  if ( PRN256 < (A + B + C) ){   // Band 10?
        Band = 0b10;
    else
        Band = 0b11;
    }
```
— 810

Fig. 8    Example Bit-Pair Profile
Range Band Value Location Logic

GENERATING STATISTICALLY COHERENT GARBAGE VALUE DISTRIBUTIONS

CROSS-REFERENCE TO RELATED APPLICATION

The present application claims priority to U.S. Provisional Application No. 63/486,799, entitled "GENERATING STATISTICALLY COHERENT GARBAGE VALUE DISTRIBUTIONS", and filed on Feb. 24, 2023. The entire contents of the above-listed application are hereby incorporated by reference for all purposes.

BACKGROUND AND SUMMARY

Embodiments of the present disclosure teach that encryption strength improvements can be achieved by blending garbage values into plaintext data before encryption, by blending garbage values into encrypted ciphertext after encryption, or both. Moreover, blending garbage values with statistical data patterns and distributions that resemble target data can provide additional improvement.

With proper analysis, Pseudo Random Numbers (PRNs) can pseudo randomly identify which garbage value should statistically follow a given value. This allows the garbage values to exhibit the statistical data patterns of target data, thereby becoming more indistinguishable from target data when blended in. When blended into the target data, the embedded generated garbage values retain statistical indistinguishability while simultaneously corrupting target data. This advantageously impedes attackers from identifying what, if any, generated garbage values exist within final ciphertext, thereby significantly impeding patternicity analysis attempts.

BRIEF DESCRIPTION OF THE DRAWINGS

FIG. 5 depicts an example of how to calculate range values for statistical bands of pattern probabilities.

FIG. 6 provides an example that depicts that a bit-pair frequency pattern analysis produces four probability tables—one for each of the four values that two bits can exhibit. Similarly, each of the four tables have four probability bands.

FIG. 7 depicts an exemplary embodiment method to survey target data sequences to develop probability tables.

FIG. 8 depicts an exemplary embodiment method to interrogate a probability table to identify which specific bit value becomes the next generated bit-pair bit value for a generated bit-pair garbage data sequence.

DETAILED DESCRIPTION

Data encryption is essential for global nation state and ecommerce security. Hence there is significant commercial value in ensuring that encrypted data cannot be decrypted by unauthorized attackers for malicious purposes. One way to achieve this is to blend garbage values into plaintext data before encryption, to blend garbage values into encrypted ciphertext after encryption, or both.

Embodiments of the present disclosure teach that there is advantage in both cases by blending pseudo randomly generated garbage values that have data patterns and distributions that statistically resemble target data the garbage values are blended with. This can be achieved by calculating the probabilities of any value following, usually immediately, a value at within the target data. The values can be single-bit values, bit-pair (two-bit) values, nibble (4-bit) values, 8-bit byte values, etc. Different sizes have different computational intensities and memory requirements. Hence, size tradeoffs exist.

Using Pseudo Random Number generators that generate Pseudo Random Numbers (PRNs), usually with a uniform distribution, produces PRNs that can pseudo randomly identify, or otherwise suggest, which garbage value should statistically follow a given value. This allows the garbage values to exhibit the statistical data pattern properties of target data, thereby becoming more indistinguishable from target data. When blended into the target data, the embedded generated garbage values retain statistical indistinguishability while corrupting the target data. This advantageously impedes attackers from identifying what, if any, generated garbage values exist within final ciphertext, thereby impeding patternicity analysis attempts during decryption attacks.

As indicated earlier, garbage values can be single-bit values, bit-pair (two-bit) values, nibble (4-bit) values, 8-bit byte values, etc. While the present disclosure may only discuss bit-pair processing as an embodiment example, it will be readily recognized that practitioners skilled in the art can easily extend the principles, methods, and teachings to other sized bit-values. Thus, the following bit-pair discussion is not meant to limit the scope of this invention.

Figure 1:
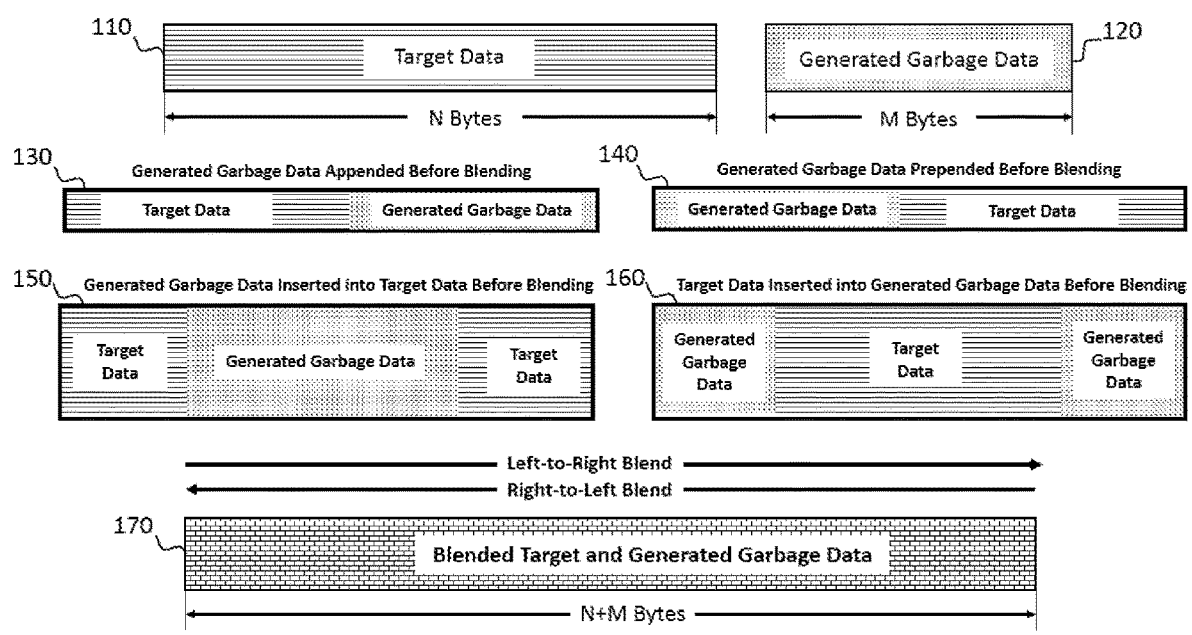
FIG. 1 depicts an example of two byte sequences and a blending overview.

FIG. 1 depicts an example of two byte sequences and a blending overview. The two depicted sequences are: (1) a N-byte target data byte sequence that benefits from obfuscating garbage blending; and (2) a M-byte generated garbage sequence this invention teaches how to generate. Initially, the two sequences are coarsely interconnected in some manner to produce a pre-blended byte sequence and then fine-grain blended using a blending means. This produces a garbage blended N+M byte generated sequence.

More particularly, FIG. 1 depicts an example of two byte sequences: (1) a Target Data [110] byte sequence containing N 8-bit bytes; and (2) an arbitrary-size Generated Garbage Data [120] sequence containing M 8-bit bytes. The present disclosure teaches that generating a Generated Garbage Data [120] sequence with a data pattern that statistically resembles the Target Data [110] byte sequence allows cryptographers to blend the two sequences together to produce a Blended Target and Generated Garbage Data [170] sequence that impedes unauthorized decryption attempts. This impediment benefit is a consequence of garbage "1" bits being indistinguishable from target "1" bits. Similarly, garbage "0" bits are indistinguishable from target "0" bits. Thus, the blended garbage bits are perfectly camouflaged in value and difficult to identify because their appearance patterns are computationally difficult to distinguish from target bit patterns.

In FIG. 1, an M-byte Generated Garbage Data [120] byte sequence and an N-byte Target Data [110] byte sequence are conjoined to construct a single byte sequence. Four example conjoining schemes are as follows:

For sequence [130], the conjoined sequence is created by appending the Generated Garbage Data [120] sequence to the Target Data [110] byte sequence;

For sequence [140], the conjoined sequence is created by prepending the Generated Garbage Data [120] sequence to the Target Data [110] byte sequence. This scheme has the advantage of obfuscating the location of file headers that have largely constant field values (e.g. PDF files);

For sequence [150], the conjoined sequence is created by inserting the Generated Garbage Data [120] sequence into the Target Data [110] byte sequence at a displacement that can be pseudo randomly determined or be fixed; and For sequence [160], the conjoined sequence is created by inserting the Target Data [110] byte sequence into the Generated Garbage Data [120] sequence into at a displacement that can be pseudo randomly determined or be fixed. This scheme also has the advantage of obfuscating file headers having largely constant field values (e.g. PDF files).

It will be appreciated that many other conjoining schemes exist and it to be understood the scope of this disclosure includes those alternatives.

Figure 2:
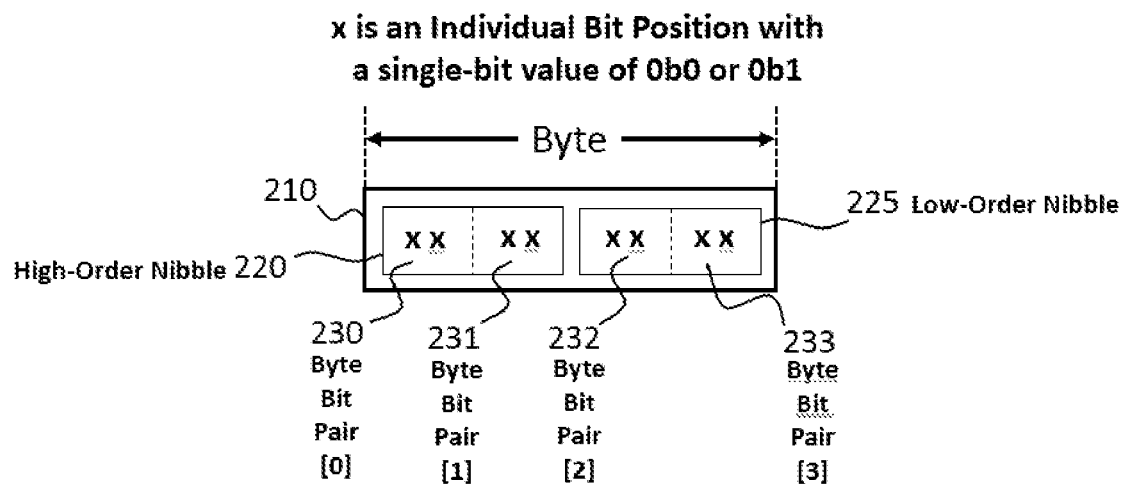
FIG. 2 depicts an example of bit, bit-pair, nibble, and byte terminology.

It will be readily recognized that practitioners skilled in the art appreciate that FIG. 2 depicts commonly adopted terminology. In FIG. 2, a data byte [210] contains 8 bits. In FIG. 2, a bit position is indicated by a "x" designation. The high-order four bits [220] are known as a nibble. The low-order four bits [225] are also known as a nibble. A byte's nibbles are bit-wise mutually exclusive and collectively exhaustive.

In FIG. 2, both nibbles (both nibble [220] and nibble [225]) contain two bit-pairs, each consisting of two adjacent bits. Nibble [220] contains bit-pairs [230] and [231]. Similarly, Nibble [225] contains bit-pairs [232] and [233]. A byte's bit pairs are bit-wise mutually exclusive and collectively exhaustive.

Within a byte, bit-pair [230] has a bit-pair byte index value of "0". Bit-pair [231] has a bit-pair byte index value of "1". Bit-pair [232] has a bit-pair byte index value of "2". Bit-pair [233] has a bit-pair byte index value of "3".

Figure 3:
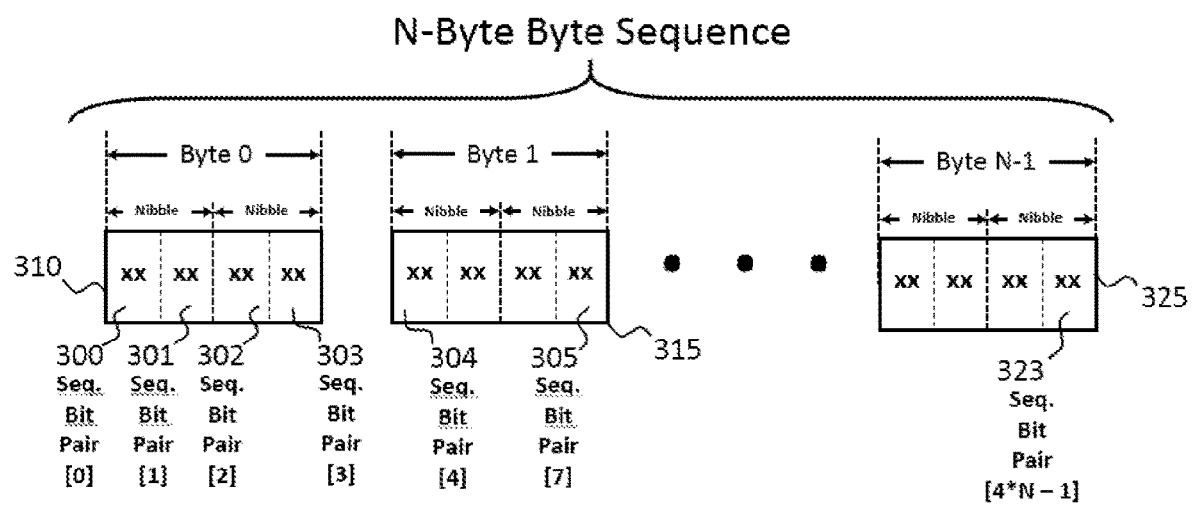
FIG. 3 depicts an example of how the collective bit-pairs can be indexed within a byte sequence.

FIG. 3 depicts an example of an N-byte byte sequence. The first sequence byte is byte [310]. The second sequence byte is byte [315]. The last sequence byte, the Nth, is byte [325]. Each sequence byte has four bit-pairs. Because there a N total bytes in the sequence, there are 4*N bit-pairs. Using the same indexing scheme described in FIG. 2, the first bit-pair [300] in the sequence has a sequence index value of "0" and the last bit-pair [323] in the sequence has a sequence index value of 4*N−1.

Figure 4:
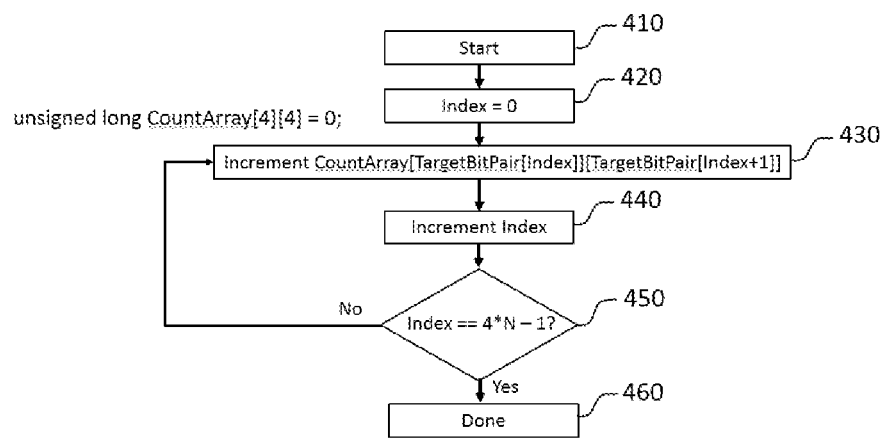
FIG. 4 depicts an example of a means to survey target data to identify statistical target data patternicity.

FIG. 4 describes an example of a process used to survey a Target Data [110] to identify data pattern probabilities. The process begins at step [410]. In step [420], a bit-pair index value is initialized to a zero value. Noting that there are four possible bit-pair values (0b00, 0b01, 0b10, and 0b11), sequence bit-pair[0] [300] can have one of four values and the following bit-pair[1] [301] can also have one of four values. This allows creating a two dimensional 4×4 array to count the collective bit-pair sequence instances in the entire byte sequence.

Specifically, in this first iteration, the value of bit-pair [0] [300] determines the counter array row value and the value of bit-pair [1] [301] determines the column value. Using this logic, step [430] increments the correct counter element in the 4×4 array. Step [440] increments the sequence bit field counter. Test [450] tests to see if the survey is done. If not, control returns to step [430] for another iteration. The second iteration would examine what the bit-pair[2] [302] value is following bit-pair[1] [301] and so on. Eventually, the survey is complete and control passes to step [460]. Note that it may be advantageous to prevent the most frequently appearing value in each of the four tables [600], [610], [620], and [630]. This is achieved by setting the corresponding count(s) to a zero value. Similarly, reducing or increasing any value in any of the tables respectively reduces or increases the probability of the associated value appearing in the generated garbage stream.

Dividing the value of each counter array element by 4*N (or dividing by the total number of appearances within the associated counter array row if adjusted as described above) expresses the count values as percentages. In FIG. 4, the array is indicated as an integer-type array. For improved percentage precision, it could be a float array.

The counting array is a 4×4 array with elements that are initialized of a zero values before use. The values in the first row's four elements (element [0b00][0b00], element [0b00][0b01], element [0b00][0b10], and element [0b00][0b11]) respectively reflect the percentages of times the values 0b00, 0b01, 0b10, and 0b11 follow 0b00. The array has four rows and a row's elements usually have different percentage values.

The next step involves selecting a range value. The value specifies the number of enumerated slots spread across the range. The larger the value, the finer granularity of bit-pair sequence differentiation.

In FIG. 5, the Range Value is 256, allowing 256 enumerated slot values. The slot values range from 0 to 255. Selecting 65536 for the Range Value provides finer differentiation, though often with higher computational cost.

As indicated in [540], suppose array element [0b00][0b11]=0.30 (30%), array element [0b00][0b10]=0.25 (25%), and array element [0b00][0b01]=0.35 (35%). These four values represent the statistical data pattern probability for 0b00.

As indicated in [540], multiplying these percentage values by 256 (the Range Value) and rounding to the nearest integer gives the number of contiguous Range slots (size of the band) allocated to each of the specific bit-pair sequence occurrences.

Hence for 0b00 in the example:

For the following bit-pair value 0b11, the range slot allocation is 77 slots [530];

For the following bit-pair value 0b10, the range slot allocation is 64 slots [520]; and For the following bit-pair value 0b01, the range slot allocation is 90 slots [510].

Adding these three values together and subtracting the sum from 256 gives a difference of 25 which is the number of contiguous Range slots (size of the band) [500] allocated to array element [0b00][0b00].

Hence, for the following bit-pair value of 0b00, the range slot allocation is 25 slots [500].

Let the variables A=25, B=90, C=64, and D=77 in the following discussion. These values correspond to the range slot allocations associated with 0b00 for its following values 0b00, 0b01, 0b10, 0b11 respectively.

In FIG. 6, it should be noted that each bit-pair value can have its own range band distribution. Specifically, in FIG. 6, the 0b00 [600] discussed in FIG. 5, the 0b01 [610], the 0b10 [620], and the 0b11 range bands are all different.

It is to be understood that if an embodiment uses nibble-sized analysis (4-bit), each of the 16 possible 4-bit values would have 16 analogous tables. Moreover, if an embodiment uses byte analysis (8-bit), each of the 256 possible 8-bit values would have 256 analogous tables and that using a Range Value of 65536 or larger may prove useful.

FIG. 7 depicts an example of how to generate a M-byte byte sequence consisting of coherent distribution garbage values. The process begins at [700].

Control passes to step [705] where an initial value is assigned that identifies a byte value used to generate a following byte value. This step could assign any of the four possible 2-bit values but uses the last Bit-Pair [323] value in the N-Byte Target Data [110] sequence. Suppose the assigned value is 0b00. Hence, the profile Range Bands that will be used in step [715] will be [600].

Step [710] generates an 8-bit PRN value using any of several methods well known to practitioners skilled in the art.

Step [715] uses the 8-bit PRN value as a slot selector value in the Range Table [600] associated with the 0b00 value.

Step [720] identifies the value associated with the band containing the identified slot. Suppose the PRN slot value is 100. This places the slot in the band ranging from 25 to 114 [510] which is associated with the bit-pair value 0b01 (Band01). Hence, the first garbage bit-pair [300] is assigned a value of 0b01.

Step [725] initializes an Index variable to "0".

Step [730] uses the first garbage bit-pair [300] to identify the specific Range Table [600] [610] [620] [630] associated with the next value assignment to garbage bit-pair [301].

Step [735] generates an 8-bit PRN value using any of several methods well known to practitioners skilled in the art. As before, the PRN value is used as a slot identifier for the identified Range Table [600] [610] [620] [630].

Step [740] identifies which band the slot is located in and the bit-pair value associated with the identified band.

Step [745] assigns the bit-pair value associated with the band to bit-pair [302]. The value can be optionally modified. For example, the value's bit-values can be inverted in value.

Step [750] increments the Index value.

Step [755] tests if the last garbage bit-pair value (bit-pair 4*M−1) was just updated. If not, control passes to [730] to generate the next garbage bit-pair. Otherwise, control passes to [760] and the Generated Garbage Data [120] generation process is complete.

FIG. 8 depicts an example of a simplistic binary search Range Table [600] [610] [620] [630] search process for the example table examined in [715]. Remembering from [540], variables A=25, B=90, C=64, and D=77. FIG. 6 teaches that Range Table [610] [620] and [630] will have different values for variables A, B, C, and D and they are derived from the percentage tables values associated with each table and the Range Value.

Finally, having generated the Generated Garbage Data [120] byte sequence, the Generated Garbage Data [120] is blended into the Target Data [110] using any of the shuffling methods known to practitioners having ordinary skill in the art. An example shuffling algorithm is the Fisher-Yates algorithm. As indicated in FIG. 1, blending shuffling operations can proceed from left-to-right or right-to-left and the selected direction can be determined pseudo randomly.

Blending shuffling operations can be total or partial. Shuffling can be both left-to-right and right-to-left for greater scrambling. The shuffle size can use 1-bit, 2-bit, 4-bit, 8-bit shuffle element sizes. The shuffle element size is independent of the selected pattern analysis bit-size (bit-pair in the example embodiment discussion). Alternately, each shuffle operation bit-size can be pseudo randomly selected.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers.

One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device.

The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like.

Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that may be accessed by a computing device. By way of example, and not limitation, computer-readable media may comprise computer storage media and communication media.

It will be appreciated that variants of the above-disclosed and other features and functions, or alternatives thereof, may be combined into many other different systems or applications.

Various presently unforeseen or unanticipated alternatives, modifications, variations, or improvements therein may be subsequently made by those skilled in the art which are also intended to be encompassed by the following claims.

The invention claimed is:

1. A computer-implemented garbage generation method, comprising:
   identifying a multiplicity-bit size;
   constructing a multiplicity of independent Value Ranges, such that all values of the identified multiplicity-bit size have an associated Value Range;
   identifying an individual multiplicity-bit value as an initial first multiplicity-bit value; and
   dividing each constructed Value Range into a multiplicity of contiguous Value-Range Bands that do not overlap and collectively encompass all possible values within the Value Range, each Value-Range Band corresponding to a second multiplicity-bit value with a span representing a desired statistical succession probability for the second multiplicity-bit value with respect to the first multiplicity-bit value associated with the Value Range.

2. The computer-implemented garbage generation method of claim 1, further comprising:
- using Pseudo Random Number (PRN) values that range between highest and lowest values within the Value Range associated with the first multiplicity-bit value, to identify the second multiplicity-bit value associated with the Value-Range Band a PRN falls within.

3. The computer-implemented garbage generation method of claim 2, further comprising:
- concatenating the identified second multiplicity-bit value to the first multiplicity-bit value to create a concatenated bit sequence of multiplicity-bit values; and
- designating the second multiplicity-bit value a first bit value.

4. The computer-implemented garbage generation method of claim 3, further comprising:
- concatenating all identified second multiplicity-bit values to the concatenated bit sequence of multiplicity-bit values, thereby creating a concatenated bit-value sequence of any desired length that exhibits a desired multiplicity-bit value sequence pattern matching a desired statistical description.

5. The computer-implemented garbage generation method of claim 4, further comprising:
- blending a statistical multiplicity-bit value sequence into a target source bit sequence.

6. One or more non-transitory computer-readable media storing instructions that, when executed by one or more processors, cause the one or more processors to perform a computer-implemented garbage generation method comprising:
- identifying a multiplicity-bit size;
- constructing a multiplicity of independent Value Ranges, such that all values of the identified multiplicity-bit size have an associated Value Range;
- identifying an individual multiplicity-bit value as an initial first multiplicity-bit value; and
- dividing each constructed Value Range into a multiplicity of contiguous Value-Range Bands that do not overlap and collectively encompass all possible values within the Value Range, each Value-Range Band corresponding to a second multiplicity-bit value with a span representing a desired statistical succession probability for the second multiplicity-bit value with respect to the first multiplicity-bit value associated with the Value Range.

7. The one or more non-transitory computer-readable media of claim 6, wherein the computer-implemented garbage generation method further comprises:
- using Pseudo Random Number (PRN) values that range between a highest value and a lowest value within the Value Range associated with the first multiplicity-bit value, to identify the second multiplicity-bit value associated with the Value-Range Band the PRN falls within.

8. The one or more non-transitory computer-readable media of claim 7, wherein the computer-implemented garbage generation method further comprises:
- concatenating the identified second multiplicity-bit value to the first multiplicity-bit value to create a concatenated bit sequence of multiplicity-bit values; and
- designating the second multiplicity-bit value a first bit value.

9. The one or more non-transitory computer-readable media of claim 8, wherein the computer-implemented garbage generation method further comprises:
- repeating a second multiplicity-bit identification sequence, concatenating all identified second multiplicity-bit values to an existing concatenated bit sequence of identified second multiplicity-bit values, thereby creating a concatenated bit-value sequence of any desired length that exhibits a desired multiplicity-bit value sequence pattern matching a desired statistical description.

10. The one or more non-transitory computer-readable media of claim 9, wherein the computer-implemented garbage generation method further comprises:
- blending a statistical multiplicity-bit value sequence into a target source bit sequence.

\* \* \* \* \*